June 15, 1965

C. N. DARLING 3,189,070

CANNED FOOD CHOPPING AND REMOVING DEVICE

Filed Oct. 26, 1962

INVENTOR
CLIFFORD N. DARLING
BY
ATTORNEYS ns Patent Office 3,189,070
Patented June 15, 1965

3,189,070
CANNED FOOD CHOPPING AND
REMOVING DEVICE
Clifford N. Darling, 132 Ashdale Ave., Winnipeg,
Manitoba, Canada
Filed Oct. 26, 1962, Ser. No. 233,474
2 Claims. (Cl. 146—61)

My invention relates to new and useful improvements in chopping and removing devices for canned foods, particularly such dense foods as canned dog food, cat food and the like.

It is well known that such products are relatively dense and are difficult to remove prior to feeding to the animal. Furthermore, with relatively small animals, it is necessary to chop the food relatively fine.

Another disadvantage of normal removal is the difficulty in measuring the amount removed as often the amount required for certain sized animals is regulated relatively strictly.

I have overcome these disadvantages by providing a circular cutting disc secured to the bottom end of a stem and having rotating means on the upper end thereof. By providing a sliding cover which engages over the open upper end of the can, rotation of the spindle causes the cutting disc to move downwardly within the product in the can, at the same time slicing it finely and breaking it up so that when the required amount has been cut, the device is merely lifted from the can bringing with it the amount of the food that has been cut or chopped by the auger disc.

The principal object and essence of my invention is therefore to provide a device of the character herewithin described which facilitates the removal of relatively dense food from cans and the like and at the same time provides means to slice the food finely.

Another object of my invention is to provide a device of the character herewithin described which incorporates means for steadying the device upon the upper open end of the can and which furthermore can be utilized as a cover to preserve the remainer of the food within the can during storage.

Yet another object of my invention is to provide a device of the character herewithin described which includes means for measuring the amount of food chopped within the can prior to removal thereof.

A still further object of my invention is to provide a device of the character herewithin described which is simple in construction, economical in manufacture, and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
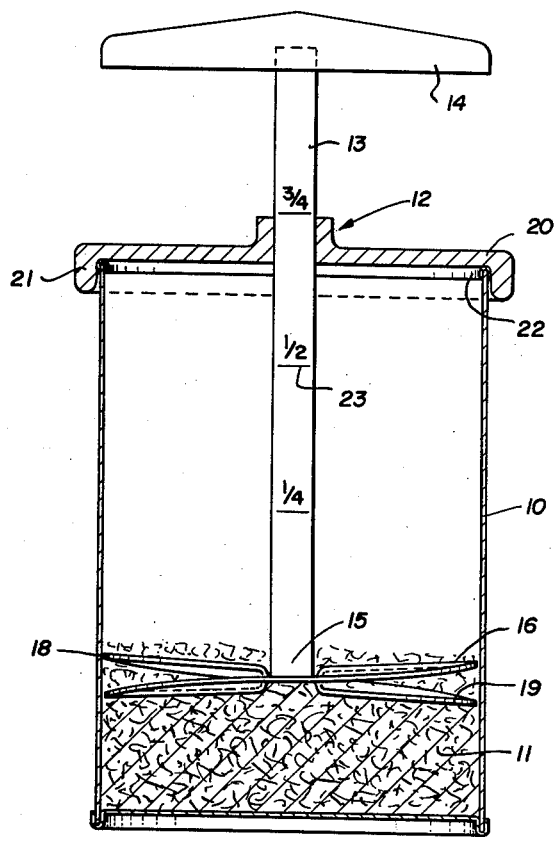
FIGURE 1 is a side elevation of my deivce shown within a can and sectioned for clarity.
Figure 2:
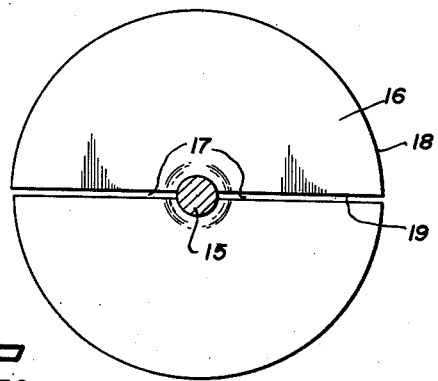
FIGURE 2 is a top plan view of the augered cutting plate.

Proceeding therefore to describe my invention in detail, reference should be made to the accompanying drawings in which 10 illustrates a conventional can containing relatively dense food 11 therewithin.

My device collectively designated 12 comprises a central, cylindrical stem 13 having a finger operated twisting handle 14 secured to the upper end thereof as clearly shown.

Secured upon the lower end 15 of the stem 13 is a cylindrical cutting plate 16, the diameter of the plate being just less than the diameter of the associated can 10.

In this embodiment, a pair of radially extending slits 17 extend from adjacent the central stem 15 to the peripheral edge 18 of the disc and the plane of these edges diverges outwardly from the stem to the periphery thus forming a relatively shallow or small pitched auger plate. The cutting edges 19 may be edge sharpened if desired. Furthermore this plate may be made of stainless steel or plastic as desired.

Freely sliding upon stem 13 is a cover plate 20 having a downwardly depending peripheral lip or flange 21 formed thereon and this lip or flange is adapted to be a friction fit over the open, upper end 22 of the associated can 10 as clearly shown in FIGURE 1.

Indicia 23 are provided on the stem 13 as indicated, corresponding with the depth of penetration of the auger plate or cutting plate 16 within the can so that the quantity of food being removed can be measured.

In operation, the conventional manner in opening the can is used, and the upper can disc is disposed of.

The cover plate 20 is slid downwardly upon the stem until it covers the cutting plate 16 whereupon the cutting plate is placed upon the upper surface of the food 11 and the cover plate 20 is engaged over the upper, open end of the can as shown in FIGURE 1.

Rotation of the handle 14 rotates the auger disc or cutting plate 16 thus causing same to penetrate the dense food and at the same time chopping or finely slicing same which passes to the area above the cutting plate 16.

When the required amount has been cut as indicated by the indicia 23, the cover plate 20 together with the entire assembly is lifted upwardly thus drawing from the can, the chopped food for deposition upon a plate or other container. The amount of pressure applied on the handle 14 controls the fineness of the slicing or cutting action so that it is relatively easy to dispense the food in the required condition.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A device for chopping and removing relatively dense food from cylindrical cans and the like, comprising in combination a central stem, a circular cutting plate secured by the center thereof transversely to the base of said stem, the diameter of said cutting plate being slightly less than the diameter of the can within which it is to be used, handle means secured to the upper end of said stem for rotating said cutter plate within said can and a sliding can cover plate freely and slideably mounted on said stem, said cover plate having a depending peripheral lip freely engageable over the upper open end of the associated can, said cutting plate comprising a planar disc with at least one radially extending slit therein, the plane of the edges of said slit diverging in a vertical direction from the stem to the periphery thus forming a relatively small pitched auger plate.

2. The device according to claim 1 which includes indicia marked on said stem corresponding to the penetration of said cutting disc into said can.

References Cited by the Examiner

UNITED STATES PATENTS

| 92,101 | 1/69 | Richardson | 146—61 |
| 1,036,968 | 8/12 | Craven | 146—61 |
| 2,385,579 | 9/45 | King et al. | 146—61 XR |

FOREIGN PATENTS

| 924,043 | 3/47 | France. |
| 559,002 | 9/32 | Germany. |
| 647,344 | 7/37 | Germany. |

J. SPENCER OVERHOLSER, *Primary Examiner.*